Figure 1:
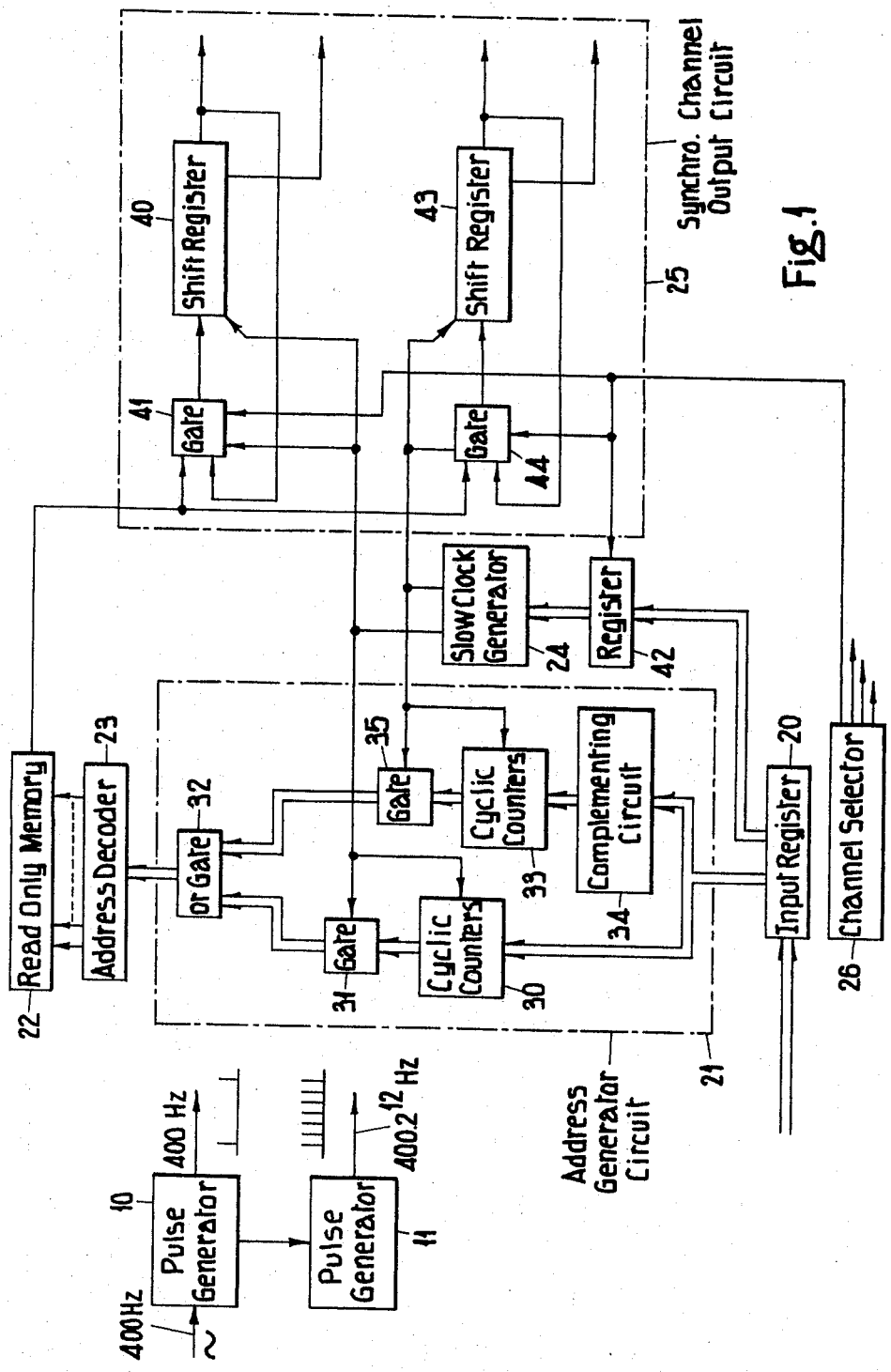

United States Patent [19]
Tooze et al.

[11] 3,870,938
[45] Mar. 11, 1975

[54] WAVEFORM GENERATOR AND PHASE SHIFTER

[75] Inventors: Michael John Tooze, Maidstone; Peter Michael Knight, Chatham, both of England

[73] Assignee: Elliott Brothers (London) Limited, London, England

[22] Filed: Apr. 17, 1972

[21] Appl. No.: 244,466

[30] Foreign Application Priority Data
Apr. 20, 1971 Great Britain............. 10200/71

[52] U.S. Cl. ........................... 318/605, 318/603
[51] Int. Cl. ........................... G05b 19/30
[58] Field of Search ........................... 318/603, 605

[56] References Cited
UNITED STATES PATENTS

| | | | |
|---|---|---|---|
| 2,849,668 | 8/1958 | Tripp | 318/605 X |
| 2,853,699 | 9/1958 | O'Neil | 318/605 X |
| 3,035,214 | 5/1962 | Kelling | 318/605 X |
| 3,177,423 | 4/1965 | Fuldner | 318/605 X |
| 3,365,634 | 1/1968 | Centner et al. | 318/603 X |
| 3,440,568 | 4/1969 | Lezan | 318/605 X |
| 3,662,242 | 5/1972 | Wacker et al. | 318/605 X |
| 3,686,487 | 8/1972 | Tripp | 318/605 X |
| 3,686,556 | 8/1972 | Anger et al. | 318/605 X |

OTHER PUBLICATIONS

Digital to Synchro Conversion, D. S. Evans, Automation, Vol. 5, No. 8, August, 1970, Gt. Brittan., pp. 23-26.

*Primary Examiner*—T. E. Lynch
*Attorney, Agent, or Firm*—Kirschstein, Kirschstein, Ottinger & Frank

[57] ABSTRACT

This invention has the overall objective of providing a plurality of sets of synchro signals, each set being a set of AC signals of fixed frequency and phase, amplitude modulated in accordance with a sinusoidal function of an arbitrarily variable phase angle. This is achieved by generating signals of fixed amplitude and suitably controlled phase, and summing them. The variable phase signals are generated by a digital technique, a sequence of "1's" suitably spaced being stored in a fixed store and read out into recirculating shift registers with suitable phasing. The digital sequence then drives switches to generate signals of accurately known amplitude. Several sets of signals can be generated in turn with the majority of the circuit being shared among all sets.

8 Claims, 2 Drawing Figures

WAVEFORM GENERATOR AND PHASE SHIFTER

This invention relates to a waveform generator suitable for use in syncho systems.

The purpose of such a generator is to develop in response to an input A.C. reference signal of predetermined frequency and phase angle (e.g., sin wt) and an input signal representing a variable angle (e.g., $\phi$), a sinusoidal output signal which is phase locked to the input reference signal and whose amplitude is a sinusoidal function of said angle (e.g., sin wt. sin $\phi$). In a 2-phase synchro system, two such signals having their phase angles 90° apart are used to drive a servo motor. In a 3-phase synchro system, the 2-phase signals are applied to a Scott transformer to produce three signals having phase angles 120° apart.

It has been known to generate these signals by using a reference signal of precisely defined amplitude, and attenuating this by means of switched resistor networks controlled by the phase angle and using precision resistors. This has the disadvantages of complexity and expense. The main object of the invention is to provide an alternative technique for generating synchro signals.

Accordingly the invention provides a waveform generator which, in response to an input A.C. reference signal having a predetermined frequency and phase angle and an input signal representing a variable angle, develops a sinusoidal output signal which is phase locked to the input reference signal and whose amplitude is a sinusoidal function of said angle represented by the input signal comprising:

a digital store for storing a digital representation of a sinusoidal waveform;

means for reading out the contents of said store;

a clock generator for producing a clock signal which is synchronised to the reference signal and which controls said read-out means so as to produce two sinusoidal signals of fixed amplitude at the frequency of the reference signal and having phase angles which are respectively advanced and retarded with respect to the phase angle of the reference signal by said variable angle;

and summing means having a pair of input terminals for receiving said sinusoidal signals for summing said sinusoidal signals whereby said desired sinusoidal output signal is produced.

Thus to generate the 2-phase pair of synchro signals sin $\phi$. sin wt and cos $\phi$. sin wt, the four signals sin (wt + $\phi$), sin (wt − $\phi$), cos (wt + $\phi$), and cos (wt − $\phi$) are generated, and combined by summing circuits according to the equations sin $\phi$. sin wt = ½(cos(wt − $\phi$) − cos (wt + $\phi$) )
cos $\phi$. sin wt = ½(sin(wt − $\phi$) + sin (wt + $\phi$) ).

(It will be seen that the summing actually includes a sign reversal in one case.) Thus the desired signals of fixed phase but adjustable amplitude are obtained from signals of adjustable phase but fixed amplitude; these latter signals are substantially easier to generate.

While it is possible to arrange for direct adjustable phase shifting of the reference signal by, e.g., reactive networks, this will involve the use of switched networks of reactances which will be little or on less complicated and expensive than the switched attenuators which have previously been used to form the synchro signals directly. The use of phase shift measurement and feedback systems will still involve a substantial amount of switching, and will also tend to suffer from a slow response time. Also, it will normally be necessary with these systems to standardize the amplitude of the resulting signals; this can be done with a feedback system controlling a variable attenuator, but this will also tend to suffer from a slow response time. A further object of the invention is therefore to provide an improved technique for generating the signals fixed amplitude and accurately adjustable phase.

According to a preferred feature of the invention the store is a digital $2^n$ stage store, the clock signal has a frequency equal to $2^n$ times the reference signal frequency and the store is read out beinning at stages determined by an $n$-bit number representative of the desired phase angle and its complement, whereby the store read-out consists of alternate pulses forming two separate trains which are representative of said sinusoidal signals.

The output signal is thus digital, and can be smoothed to give the desired waveform. By generating the final digital output with accurately defined levels, the amplitude of the waveform can be accurately controlled. The phase shift is defined directly in digital form, and its accuracy is determined by the value of $n$. The circuitry up to the smoothing circuitry is digital, so that signal amplitudes in this circuitry need only be controlled to normal digital standards, i.e., only sufficiently well to permit unambiguous discrimination between "0" and "1", apart from the final output stage.

The output of the fixed store is preferably applied to a $2^n$ stage shift register to which the clock pulses are also fed. The shift register is made recirculating, so that the fixed store need be read once only for a given phase shift. Once the waveform has been entered into the shift register, it is recirculated as long as desired. If waveforms of fixed phase difference are required, they can be picked off at appropriate points along the shift register.

The clock frequency is, as stated above, $2^n$ times the reference signal frequency, where the lower limit for $n$ is set by whichever is the greater of two factors. One factor is the required accuracy with which the phase shift must be set, and the other factor is the accuracy with which the required waveform must be represented in digital form. If these two factors are approximately equal, then the system as described so far is satisfactory. However, it may be that the first factor is several times as great as the second. In this case, the system can be modified so that a fast clock signal of frequency $2^{(n+k)}$ times the reference frequency is generated, and a slow clock signal of frequency $(1/2k)$ times the fast clock frequency is generated from the fast clock signal and with its phase adjustable in $k$ equal steps, with the slow clock signal being used to drive the fixed store and shift register. Thus with say $n = 8$ and $k = 4$, a phase setting accuracy of 1 in $2^{12}$ is achieved with a fixed store and shift register length of $2^8$ bits each.

In many examples of the use of synchro systems, it is necessary to have several synchro systems which share a common reference signal but can be set with independent phase angles. This normally requires a number of completely independent means for generating the various synchro signals. However, if the digital system described above is used, a large part of the circuitry for generating several synchro signals need be provided only once, being time-shared between the different signals; only the shift registers and associated and following circuits need be provided separately for each synchro signal. Thus according to a third aspect, the invention provides a system for generating a plurality of separate synchro signals with a common reference signal, using the digital circuitry described above and with the appropriate parts provided only once and time-shared for the different synchro signals.

Figure 2:
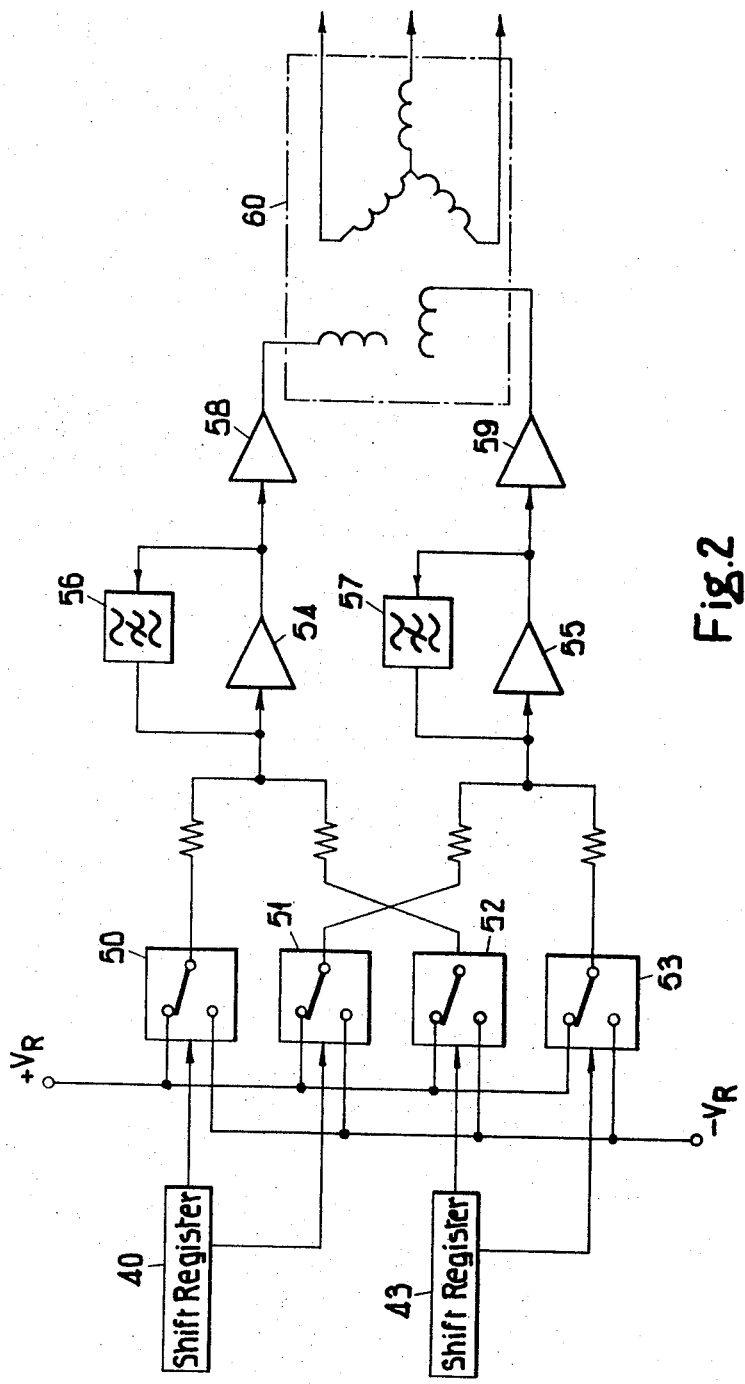

An embodiment of the invention will now be described, by way of example, with reference to the accompanying drawings, in which:

FIGS. 1 and 2 are block diagrams of successive parts of a multichannel synchro system.

Referring first to FIG. 1, the reference frequency is fed as a nominal 400 Hz sine wave to pulse forming circuits 10 and 11 which generate a 400 Hz pulse signal which is phase-and frequency-locked to the 400 Hz sine wave, and a fast clock signal at frequency $2^{12}$ times the 400 Hz pulse signal. These two signals are used to control the timing throughout the rest of the circuitry.

The desired phase shift is fed as a 12-bit binary number into a 12-bit input register 20. From here, the upper 8 bits are fed to address generator circuitry 21, which generates a continuously ascending sequency of addresses. These addresses drive a read-only memory 22 via an address decoder 23.

The read-only memory 22 contains a digital representation of one cycle of a sine wave, the density of 1 at any point in the memory 22 being proportional to the amplitude of the sine wave at that point. The output of the read-only memory 22 is fed to synchro channel output circuitry 25, in which it is stored in a shift register and thereafter recirculated. The lowest 4 bits of the phase shift register 20 are fed to a slow clock generator 24, which controls the timing of the circuitry 21 and 25.

The slow clock generator 24 can conveniently comprise a 16-stage ring-tailed counter of 8 flip-flops (not shown). All but one of the flip-flops have their set and reset inputs fed from the set and reset outputs of the preceding flip-flop; the first flip-flop has its set and reset inputs fed from the reset and set outputs, respectively, of the last flip-flop. Initially all the flip-flops are in the same state; as the fast clock pulses are applied to them, each flip-flop in turn changes state. Sixteen outputs are taken from this counter, one from each side of each flip-flop. The ring-tailed counter completes one full circulation back to its original state for every 16 pulses of the fast clock. Each of the outputs is a square wave of mark: space ratio 1:1, and each output is phase-shifted by one fast clock pulse period from the preceding output. These 16 output signals are all potential slow clock signals, and one of them is selected as the actual slow clock signal.

Considering the operation of the whole circuit in more detail, the input register 20 has its upper 8 bits fed to an 8-bit cyclic counter 30 at the beginning of a period defined by the 400 Hz pulse signals from timing circuit 10. The lowest 4 bits of register 20 are fed to the slow clock generator 24, where they are deceded and used to select one of the 16 potential slow clock signals. These slow clock signals are fed to the counter 30, causing it to count up and complete one cycle in the period between two pulses from timing circuit 10. Each time the counter 30 counts up by one unit, gating circuits 31 are opened to pass the count in counter 30 through a set of OR gates 32 to the read-only memory address decoder 23. The relevant location in the read-only memory 22 is therefore read.

During a single period between two 400 Hz pulses, the read-only memory therefore has every one of its $2^8$, i.e., 256, locations read out, in order, starting at a point defined by the upper 8 bits in register 20. The read out is in phase with the selected slow clock signal, which is timed relative to the fast clock signals by the lowest 4 bits in register 20.

The slow clock signals are also applied from the slow clock generator 24 to a shift register 40 in the circuitry 25, via a gate 41 which is controlled at this time to permit the output from the read-only memory 22 to pass into it. Thus during the period between two 400 Hz pulses, the whole of the contents of the read-only memory 22 are fed into the shift register 40, which has a capacity of 256 bits. During following 400 Hz periods, gate 41 is controlled to permit the contents of the shift register 40 to recirculate. In addition, the lowest 4 bits of register 20 are stored in a 4-bit register 42, which is placed between register 20 and generator 24, so that the slow clock signal selection is maintained for all following 400 Hz periods while the contents of register 20 may be changed.

In addition to the circuitry described so far, the address selection circuitry 21 also contains a second counter 33, similar to counter 30, fed from register 20 via a complementing circuit 34. This complementing circuit forms the "ones" complement of the number applied to it, changing each bit independently. The generator 24 also contains a 4-bit complementing circuit (not shown) which forms the ones complement of the lowest four bits of the contents of register 20,. and selects a second slow clock signal accordingly. This second slow clock signal is fed to counter 33 and to a gating circuit 35 similar to gating circuit 31, so that the read-only memory also has the complementary location selected to start with, counter 33 counting upwards like counter 30 so that the two selected locations in the read-only memory both move forward through the memory in the same direction. Thus the output of memory 22 consists of alternate pulses in two separate trains.

The output of memory 22 is also fed to a second shift register 43 via a gate 44, similar to the shift register 40 and the gate 41. Shift register 44 is controlled by the second slow clock output from generator 24, and the two trains of pulses from memory 22 are thus separated out into shift registers 40 and 43 respectively.

By this means, while shift register 40 is being filled with the pulse train from the read-only memory 22 with a phase shift determined by the contents of register 20, shift register 43 is simultaneously filled with the same pulse train with the complementary phase shift. The reason why a ones complement instead of a "twos" complement is used is to ensure that the pulses of the two pulse trains are always distinct; the use of a twos complement could result in the two trains having the same slow clock signal and thus coinciding.

The signals in the shift registers 40 and 43 are representations of sine waves with appropriate phase shifts in digital form, so that the density of 1 at any point along the signal is proportional to the amplitude of the sine wave at that point. Precision switches are used to standardize the amplitude of the digital forms, and the signals are thereafter combined and smoothed to yield the desired smooth three-phase synchro outputs.

Referring now to FIG. 2, the two shift registers 40 and 43 are repeated for convenience. After these two registers have been filled, their contents are recirculated by the slow clock signals selected by the generator 24. The outputs from the two shift registeres will therefore be $\sin(wt = \phi)$ and $\sin(wt - \phi)$ in pulse form, where $\phi$ is the phase shift defined by the contents of register 20 and the read-only memory contains a representation of a single cycle of sine wave from 0° to 360°. The two shift registers are also tapped at points three-quarters of the way along each, so that the signals $\cos(wt = \phi)$ and $\cos(wt - \phi)$ are available from these tapping points. These four signals, all in digital form, are fed to four respective precision switches 50 to 53 which are supplied with precisely controlled reference voltages $+V_R$ and $-V_R$, so that their outputs are digital pulse trains of precisely controlled amplitude. These pulse trains are combined by two resistor adding networks, in accordance with the equations given in the introduction, to form signals $2 V_R \sin \phi . \sin wt$ and $2 V_R \cos \phi . \sin wt$, still in pulse form but probably containing superposed digital pulses. These signals are amplified in respective amplifiers 54 and 55 with filtering feedback networks 56 and 57 to smooth their outputs. These amplifiers drive power stages 58 and 59, which in turn drive a Scott transformer 60 which converts the 2-phase signals from power stages 58 and 59 to 3-phase signals.

The description so far has been in terms of a single synchro channel. The accommodate a plurality of synchro channels, the circuitry in block 25 and onwards must be multiplicated for the various channels, including the provision of a separate slow clock generator 24 for each channel. A small amount of additional control circuitry, represented as block 26, and comprising chiefly a channel selector, must also be provided. The remainder of the circuitry of FIG. 1, however, can be shared between the different channels. The operation is that the channel selector 26 selects a particular channel, and enables the 4-bit register in the relevant synchro channel output circuitry 25 to receive the lowest 4 bits from input register 20, which contains the phase shift required for that channel. The corresponding 4-bit registers in the synchro channel output circuitry of the other channels retain their previous contents unchanged. The relevant slow clock generator 24 is coupled to the read-only memory address selection circuitry 21, and the read-only memory is read out and feeds the relevant synchro channel output circuitry 25. The gates 41 and 44 of the relevant channel are operated by the selection signal from channel selector 26 to pass the read-only memory output into the associated shift registers 40 and 43. Thus the contents of the shift registers of the selected synchro channel are changed while the other synchro channels continue to generate their previous outputs unchanged.

We claim:

1. A waveform generator which, in response to an input A.C. reference signal having a predetermined frequency and phase angle and an input signal representing a variable angle, develops a sinusoidal output signal which is phase locked to the input reference signal and whose amplitude is a sinusoidal function of said angle represented by the input signal, comprising:
   a digital store for storing a digital representation of a sinusoidal waveform;
   means for reading out the contents of said store;
   a clock generator for producing a clock signal which is synchronised to the reference signal and which controls said read-out means so as to produce two sinusoidal signals of fixed amplitude at the frequency of the reference signal and having phase angles which are respectively advanced and retarded with respect to the phase angle of the reference signal by said variable angle;
   and summing means having a pair of input terminals for receiving said sinusoidal signals for summing said sinusoidal signals, whereby said desired sinusoidal output signal is produced.

2. A waveform generator according to claim 1, in which the store is a digital $2^n$ stage store, the clock signal has a frequency equal to $2^n$ times the reference signal frequency and the store is read out beginning at stages determined by an $n$-bit number representative of the desired phase angle and its complement, whereby the store read-out consists of alternate pulses forming two separate trains which are representative of said sinusoidal signals.

3. A waveform generator according to claim 2, in which the means for reading out the contents of the store comprises an input register for containing said $n$-bit number, first and second cyclic counters whose counting rate is controlled by the clock signal, an OR gate having its inputs connected to the outputs from the counters, an address decoder having its input connected to the OR gate and a complementing circuit connected between the input register and one of the counters.

4. A function senuator waveform, generator according to claim 2 in which the store read-out is applied to gating circuits which are controlled by the clock signal to respectively pass alternate pulses.

5. A waveform generator according to claim 4 in which the outputs from the gating circuits are applied to recirculating shift registers, whereby the store needs to be read only once for a given phase angle.

6. A waveform generator according to claim 5, in which the shift registers are tapped to provide sinusoidal signals having different phase angles.

7. A waveform generator according to calim 5 in which the outputs from the shift registers are fed to respective precision switches which are supplied with precisely controlled reference voltages to produce outputs which are digital pulse trains of precisely controlled amplitude.

8. A waveform generator according to claim 1 including a further clock signal generator for generating a fast clock signal having a frequency equal to $2^{(n+k)}$ times the reference frequency, the further clock signal generator controlling the clock signal generator so that k outputs are produced, each output being phase shifted by one fast clock pulse period from the preceding output, two of such outputs being selected to read out the store in accordance with the k least significant digits and the complement thereof respectively, of a $(n + k)$ − bit number whose most significant digits constitute said $n$-bit number which determines the stage of which readout of the store begins.

* * * * *